United States Patent Office 3,143,578
Patented Aug. 4, 1964

3,143,578
PREPARATION OF TRICYCLO [8.2.1.0²,⁹]
TRIDECA-5,11-DIENE
George L. O'Connor, Henry E. Fritz, and David W. Peck, Charleston, W. Va., assignors to Union Carbide Corporation, a corporation of New York
No Drawing. Filed Dec. 28, 1962, Ser. No. 247,836
1 Claim. (Cl. 260—666)

This application relates to the preparation of tricyclo-[8.2.1.0²,⁹]trideca-5,11-diene by the reaction of cyclopentadiene with 1,5-cyclooctadiene.

The preparation of tricyclo[8.2.1.0²,⁹]trideca-5,11diene can be illustrated by the following equation:

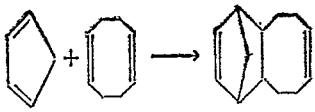

Either cyclopentadiene or dicyclopentadiene can be reacted with 1,5-cyclooctadiene to produce tricyclo-[8.2.1.0²,⁹]trideca-5,11-diene. Dicyclopentadiene readily decomposes to cyclopetnadiene when heated at about 160° C. or higher. The cyclopentadiene produced then reacts with the 1,5-cyclooctadiene as explained above.

When affecting reaction according to the process of the instant invention, it is preferable to employ a substantial excess of the 1,5-cyclooctadiene over the stoichiometric amount required because of the tendency of cyclopentadiene to condense with itself. Amounts of 1,5-cyclooctadiene of from about 2 to about 4 times the stoichiometric equivalent are preferred for this purpose, but amounts of from as little as about 0.1 mole to as much as about 20 moles of 1,5-cyclooctadiene per mole of cyclopentadiene present can also be employed. When an excess of 1,5-cyclooctadiene is employed, the 1,5-cyclooctadiene acts as a solvent as well as functioning as a reactant. If desired, an inert liquid solvent can also be employed. Suitable inert liquid solvents which can be employed include hydrocarbons such as hexane, cyclohexane, heptane, benzene, toluene, and the like, ethers such as dioxane, tetrahydrofuran, and the like, and ketones such as acetone and the like. In general, an amount of solvent ranging from about 0.5 to about 20 times, preferably from about 2 to about 4 times, the weight of the reactants present can be effectively employed.

The process of the instant invention can be conducted in either a batchwise or continuous manner at pressures of from about 100 p.s.i.g., or less, to about 10,000 p.s.i.g., or more. When a batch procedure is employed, reaction is usually effected in a closed system under autogenous pressure, usually at a pressure of from about 100 p.s.i.g. to about 500 p.s.i.g. When the process is conducted continuously, the reactants are usually fed through a presurized reactor at a pressure of from about 500 p.s.i.g. to about 10,000 p.s.ig., or more, preferably from about 1000 p.s.i.g. to about 4000 p.s.i.g.

The reaction time is not critical, but longer reaction times usually result in greater yields. Reaction times of from about 1 to about 6 or more hours, preferably from about 3 to about 4 hours, are satisfactory for batch operations. When the reaction is conducted continuously, the rate of flow of the reactants through the reactor is preferably regulated so that from about 2 to about 30, most preferably from about 10 to about 20, liters of reaction mixture per liter of reactor volume pass through the system each hour. The ratio of the liters of reaction mixture to liter of reactor volume passing through the system in one hour is known as the liquid hourly space velocity.

Reaction according to the process of the instant invention readily occurs at temperatures ranging from about 150° C., or less, to about 350° C., or higher. When the reaction is conducted in a batchwise manner, a temperature of from about 200° C. to about 250° C. is preferred. When the reaction is conducted continuously, a temperature of from about 250° C. to about 300° C. is preferred.

The tricyclo[8.2.1.0²,⁹]trideca-5,11-diene produced by the process of the instant invention can be recovered from the reaction mixture by conventional techniques, such as by distillation. These products can be epoxidized and polymerized, as is obvious to one skilled in the art. Polymerization takes place in the presence of from about 0.01 to about 5 percent by weight of a free radical producing initiator. When this product is epoxidized, both monoepoxy and diepoxy derivatives can be produced. Epoxidation can be effected by means of peracids such as peracetic acid, perbenzoic acid, monoperphthalic acid, performic acid and the like, at temperatures of from about —25° C. to about 150° C., preferably from about 10° C. to about 90° C.

The epoxy derivatives can be polymerized and cured alone or with appropriate hardeners such as polycarboxylic acid compounds, polycarboxylic acid anhydrides, polyols, polyfunctional amines, and combinations thereof. Typical catalysts which can be added, if desired, to accelerate the curing are base and acid catalysts, particularly acid catalysts of the Lewis acid type. Typical Lewis acid type catalysts include boron trifluoride, stannic chloride, zinc chloride, aluminum chloride, ferric chloride and the like. Complexes of the various Lewis acids, such as etherates, and aminates of boron trifluoride are also effective. Other acid catalysts which can be employed include sulfuric acid, phosphoric acid, perchloric acid, polyphosphoric acid, and various sulfonic acids such as paratoluenesulfonic acid and benzenesulfonic acid. Typical bases include the alkali metal hydroxides, e.g., sodium hydroxide and potassium hydroxide, and quaternary ammonium compounds, e.g., benzyltrimethylammonium hydroxide, tetramethylammonium hydroxide and the like. Catalysts in amounts ranging up to 5.0 weight percent, based on the weight of the epoxide, can be added at any time prior to curing, or not at all, as desired. Higher catalyst concentrations above this range are also effective, although concentrations of 5.0 weight percent and below have been found to be adequate.

Curing can be effected at temperatures from about 25° C. to 250° C. Temperatures higher than 250° C. can also be used, although some discoloration, which may not be desired in the final product, may result. The time for effecting a complete cure can be varied from several minutes to several hours.

The curable compositions can be used in coatings, castings, moldings, bondings, laminates and the like in the manufacture of articles having a multitude of uses. These compositions can be colored by pigments and very appealing appearances may be imparted to articles made therefrom. Fillers can also be incorporated in these compositions so as to impart special properties to articles manufactured therefrom. Such sundry articles as buttons, combs, brush handles, structural parts for instrument cabinets and the like can be formed through the use of these curable compositions.

The following examples are set forth for purposes of illustration so that those skilled in the art may better understand this invention, and it should be understood that they are not to be construed as limiting this invention in any manner.

*Example 1*

A solution of 547 grams (5 moles) of 1,5-cyclooctadiene and 668 grams (5 moles) of dicyclopentadiene in 2,533 grams of toluene was continuously passed through a 60 cc. tubular reactor about 11 feet long and ³⁄₁₆ inch in inside diameter at a liquid hourly space velocity of 6.2. The reactor was maintained at a temperature of 290° C. and a pressure of 4,000 p.s.i. The mole ratio of available cyclopentadiene to 1,5-cyclooctadiene was 2:1.

About 3,619 grams of liquid reaction product were recovered. The reaction product was distilled and 70 grams (0.4 mole) of tricyclo[8.2.1.0$^{2,9}$]trideca-5,11-diene, boiling at a temperature of 90° C. to 97° C. at 5 mm. Hg pressure, were collected. This represented a yield of 8 percent, based on 1,5-cyclooctadiene.

Redistilled tricyclo[8.2.1.0$^{2,9}$]trideca-5,11-diene had a boiling point of 102° C. at 5 mm. Hg pressure, an index of refraction of 1.5260 at 20° C., and a density of 0.978 at 20° C. The infrared spectrum of this product was consistent with the proposed structure.

Analysis.—Calculated for $C_{13}H_{18}$: C, 89.6%; H, 10.4%. Found: C, 89.5%; H, 10.4%.

Tricyclo[8.2.1.0$^{2,9}$]trideca-5,11-diene exists in both endo and exo forms. The exo isomer has been isolated from a mixture of the two by preparative scale vapor phase chromatography. The endo isomer has been separated from a mixture of the two by distillation at reduced pressure. The endo isomer decomposes into cyclopentadiene and 1,5-cyclooctadiene when heated above 230° C. Thermal treatment of a mixture of the two isomers at atmospheric pressure and subsequent distillation at reduced pressure permitted recovery of the exo isomer.

The endo isomer has a boiling point of 106° C. at 6 mm. Hg pressure, an index of refraction of 1.5262 at 20° C., and a molecular weight of 174, as determined by mass spectrometry.

Analysis.—Calculated for $C_{13}H_{18}$: C, 89.6%; H, 10.4%. Found: C, 89.6%; H, 10.4%.

The exo isomer has a boiling point of 90° C. at 5 mm. Hg pressure, an index of refraction of 1.5210 at 20° C., and a molecular weight of 174 (calculated, 174), as determined by mass spectrometry.

Analysis.—Calculated for $C_{13}H_{18}$: C, 89.6%; H, 10.4%. Found: C, 89.2%, H, 10.3%.

Example 2

The procedure of Example 1 was repeated at a temperature of 310° C. and at a liquid hourly space velocity of 12.1 employing a mole ratio of 1,5-cyclooctadiene to available cyclopentadiene of 3:1. A yield of tricyclo[8.2.1.0$^{2,9}$]trideca-5,11-diene of 24 percent, based on 1,5-cyclooctadiene, was obtained.

Example 3

To a three-liter stainless steel rocking autoclave were charged 264 grams of dicyclopentadiene (2.0 moles), 108 grams of 1,5-cyclooctadiene (1.0 mole), and 50 milliliters of cyclohexane. The autoclave was sealed and heated to a temperature of 225° C. over a period of 1¼ hours, and then maintained at a temperature of 225±2° C. for four hours. A maximum pressure of 220 p.s.i. was attained.

The reaction product was a light yellow liquid which weighed 718 grams and contained 61 grams of white solids, which were separated by filtration. The white solids, polymeric by-products, were insoluble in acetone and melted above 300° C.

The liquid portion was fractionally distilled and 18 grams of tricyclo[8.2.1.0$^{2,9}$]trideca-5,11-diene were collected. This represented a yield of 10.4 percent, based on the 1,5-cyclooctadiene.

What is claimed is:

Tricyclo[8.2.1.0$^{2,9}$]trideca-5,11-diene.

No references cited.